(12) United States Patent
Fehenberger et al.

(10) Patent No.: US 12,308,877 B2
(45) Date of Patent: May 20, 2025

(54) PERFORMANCE MONITORING DEVICE, METHOD FOR PERFORMANCE MONITORING OF AN OPTICAL SYSTEM, AND OPTICAL SIGNAL NETWORK

(71) Applicant: ADVA Optical Networking SE, Meiningen ot Dreissigacker (DE)

(72) Inventors: Tobias Fehenberger, Meiningen (DE); Henrik Enggaard Hansen, Meiningen (DE)

(73) Assignee: ADTRAN NETWORKS SE, Meiningen ot Dreissigacker (DE)

( * ) Notice: Subject to any disclaimer, the term of this patent is extended or adjusted under 35 U.S.C. 154(b) by 167 days.

(21) Appl. No.: 18/101,768

(22) Filed: Jan. 26, 2023

(65) Prior Publication Data
US 2023/0254037 A1    Aug. 10, 2023

(51) Int. Cl.
*H04B 10/079* (2013.01)
*H04B 10/077* (2013.01)
*H04B 10/61* (2013.01)

(52) U.S. Cl.
CPC ... *H04B 10/07953* (2013.01); *H04B 10/0775* (2013.01); *H04B 10/616* (2013.01)

(58) Field of Classification Search
CPC .. H04B 10/079–0799; H04B 10/07953; H04B 10/616
(Continued)

(56) References Cited

U.S. PATENT DOCUMENTS

2008/0205886 A1\* 8/2008 Anderson ........ H04B 10/07955
398/26
2015/0180570 A1\* 6/2015 Malouin .......... H04B 10/07955
398/25
(Continued)

FOREIGN PATENT DOCUMENTS

WO    WO-2013/185845 A1    12/2013

OTHER PUBLICATIONS

European Search Report corresponding to EP Patent Application No. 22155411.6 dated Aug. 3, 2022.
(Continued)

*Primary Examiner* — Li Liu
(74) *Attorney, Agent, or Firm* — Jenkins, Taylor & Hunt, P.A.

(57) ABSTRACT

The present invention provides a performance monitoring device, an optical signal network with performance monitoring, and a performance monitoring method. The performance monitoring device (100) comprises a coherent receiver (10), an analog-to-digital-converter, ADC (20), a digital signal processing module, DSPM (30), and a noise correction module, NCM (40),
the receiver (10) having a second bandwidth that is smaller than the first bandwidth (BW1) such that the receiver (10) is configured to output an electrical analog signal (72) with the second bandwidth based on the received optical signal (71) having the first bandwidth,
the ADC (20), being configured to generate from the electric analog signal (72) a digital input signal (73) with the second bandwidth;
the DSPM (30) being configured to generate a raw performance monitoring metric, RPMM (74), based on the digital input signal (73);
wherein the NCM (40) is configured to generate a performance monitoring metric, PMM (75), based on the
(Continued)

digital input signal (73) by compensating distortion in the RPMM (74) caused by the coherent receiver (10) having a smaller bandwidth than the optical signal (71).

15 Claims, 3 Drawing Sheets

(58) Field of Classification Search
USPC .............................. 398/25–33, 177, 25–26
See application file for complete search history.

(56) References Cited

U.S. PATENT DOCUMENTS

| 2016/0112138 A1* | 4/2016 | Alfiad .............. H04B 10/50595 |
| | | 398/182 |
| 2016/0227300 A1* | 8/2016 | Lai ...................... H04J 14/0275 |
| 2019/0036600 A1* | 1/2019 | Jiang .................. H04B 10/0775 |

OTHER PUBLICATIONS

Do et al. (2014) "Data-Aided OSNR Estimation Using Low-Bandwidth Coherent Receivers," IEEE Photonics Technology Letters, vol. 25, No. 13, pp. 1291-1294.

* cited by examiner

PERFORMANCE MONITORING DEVICE, METHOD FOR PERFORMANCE MONITORING OF AN OPTICAL SYSTEM, AND OPTICAL SIGNAL NETWORK

CROSS-REFERENCE TO RELATED APPLICATIONS

This application claims the priority benefit of European Patent Application No. 22155411.6, filed on Feb. 7, 2022, the disclosure of which is incorporated herein by reference in its entirety.

FIELD OF THE INVENTION

The present invention pertains to a performance monitoring device, a method for performance monitoring of an optical system, and an optical signal network, in particular a disaggregated optical signal network. The optical signal network allows performance monitoring as well. Performance monitoring in this context means the generation of a performance monitoring metric such as an optical signal-to-noise-ratio, OSNR. The devices, methods and systems described herein preferable enable distributed monitoring.

BACKGROUND OF THE INVENTION

Optical signal networks can process large amounts of data with high reliability. The efficiency of such networks can be further increased by shifting from direct detection (using e.g. photo diodes) to coherent detection which comprises phase information. Coherent receivers also make it possible to monitor and compensate linear impairments, for example, dispersion effects such as chromatic dispersion or polarization mode dispersion in digital signal processing in a digital signal processing module.

Modern coding and error correction schemes can be precisely adapted to specific networks and even to the current state of a specific network. For operating an optical signal network in an optimal manner, performance monitoring is an important element.

Currently, performance monitoring is usually concentrated at network end points (data sinks). Hardware that is used in performance monitoring is comparatively expensive so that it must be carefully selected where it is arranged. It follows that the knowledge about the performance of the optical signal network is restricted by the number of such devices deployed and their deployment location. One important reason for the high costs for the performance monitoring hardware stems from one of the main advantages of optical signal network, namely the high bandwidths transmitted and processed therein.

The scientific publication by Do et al., "Data-Aided OSNR Estimation Using Low-Bandwidth Coherent Receivers", IEEE Photonics Technology Letters, Vol. 26, No. 13, Jul. 1, 2014, (hereafter cited simply as "Do et al.") proposes an optical signal-to-noise-ratio (OSNR) estimation technique using low coherence receivers for coherent optical systems with data-aided channel estimation. Data-aided approaches reserve a part of the system bandwidth for so-called training sequences that can then be analyzed, utilizing specific properties of the training sequences. The method proposed in Do et al. crucially relies on the use of so-called Golay sequences, which fulfill certain properties related to their power spectrum. Based on these properties, it is described that an OSNR can be calculated reliably.

SUMMARY OF THE INVENTION

In view of the foregoing, it is an objective of the current invention to provide a performance monitoring device and method, and an optical signal network utilizing these, with free choice in the coding schemes, which nevertheless allow low-cost performance monitoring, preferably in a distributed manner.

These objectives are fulfilled by the subject-matter of the independent claims.

Accordingly, according to a first aspect of the present invention, a performance monitoring device, PMD, is provided for performance monitoring of an optical signal having a first bandwidth, the performance monitoring device, PMD, comprising a coherent receiver, an analog-to-digital-converter, ADC, a digital signal processing module, DSPM, and a noise correction module, NCM;

The receiver has a second bandwidth that is smaller than the first bandwidth such that the receiver is configured to output an electrical analog signal with the second bandwidth based on the received optical signal having the first bandwidth.

The analog-to-digital converter, ADC, is configured to generate from the electric analog signal a digital input signal with the second bandwidth.

The noise correction module, NCM, is configured to generate a performance monitoring metric, PMM, based on the digital input signal by compensating distortion, in particular interference in a raw performance monitoring metric, RPMM, the distortion being caused by the coherent receiver having a smaller bandwidth than the optical signal, i.e. from narrow-band filtering by the coherent receiver.

Here and in the following, for some (especially longer) terms abbreviations (such as "PMD" for "performance monitoring device") are used. Usually, the terms will be given followed by the corresponding abbreviations, as in "performance monitoring device, PMD". In some cases, to improve legibility, only the abbreviation will be used, whereas in other cases only the term itself will be used.

One main idea of the present invention that an accurate estimation of a performance monitoring metric, PMM, e.g. an OSNR, can be performed using only a small-bandwidth section of the original optical signal distortions caused by this use of the small-bandwidth section is compensated. This in turn allows using a receiver having a lower bandwidth than the signal itself in the performance monitoring device, PMD, or in the performance monitoring method according to the present invention.

The fact that the coherent receiver (or: low-bandwidth coherent frontend) has a lower bandwidth allows to design the receiver with lower specifications, thus lowering costs, or allows a receiver with higher specifications to perform the performance monitoring faster and/or to perform more performance monitoring tasks concurrently.

In contrast to the prior art, it is not the use of specific training sequences such as Golay sequences that allows using a small-bandwidth section of the original signal for the performance monitoring but the compensation of the distortion, in particular interference. Thus, preferably, the optical signal of which the performance is monitored may or may not comprise any pilot symbols or "training sequences" in the language of "Do et al".

Addition advantages, options, variants and modifications will be described in the following with respect to the dependent claims as well as to the figures and their detailed description.

In some advantageous embodiments, refinements, or variants of embodiments, the second bandwidth is between about 5% and about 20% of the first bandwidth, preferably between about 7.5% and about 17.5% of the first bandwidth, more preferably between about 10% and about 15% of the first bandwidth.

On the one hand, a lower percentage is advantageous since it means that the receiver can be designed and constructed with less resources (working memory, data storage capacity, computing power, electrical power, cooling power and/or the like), or can handle more tasks concurrently with the present resources. On the other hand, it has been found by the inventors that a percentage below a certain threshold surprisingly increases distortion so strongly that a compensation becomes much less reliable. The inventors have determined that the above ranges of percentages of the second bandwidth compared to the first bandwidth are ideally suited for the present invention.

In some advantageous embodiments, refinements, or variants of embodiments, the first bandwidth of the optical signal is larger than about (or precisely) 50 GHz, preferably larger than about (or precisely) 100 GHz, more preferably larger than about (or precisely) 125 GHz. Clearly, a higher bandwidth of the optical signal allows fast communication over the optical signal network.

In some advantageous embodiments, refinements, or variants of embodiments, the second bandwidth is smaller than about (or precisely) 30 GHz, preferably smaller than about (or precisely) 20 GHz. Such bandwidths allow the use of ready-made, easily available components in the receiver and other parts of the performance monitoring device, PMD, which reduces financial and logistic effort of providing them.

In some advantageous embodiments, refinements, or variants of embodiments, the receiver is configured to receive a portion having the second bandwidth of the optical signal that comprises a center frequency of the optical signal. Preferably, the received portion of the optical signal is centered around the center frequency of the optical signal. The center part of the optical signal of the optical signal network is generally (or comparatively) free from boundary effects and is therefore especially suitable for the present invention.

In some advantageous embodiments, refinements, or variants of embodiments, the performance monitoring metric, PMM, comprises a factor, in numerator or denominator, that is a sum of squared absolute values of time-domain Fourier coefficients h(i) of the digital input signal, for i=0 . . . N, N being a predefined integer. In other words, the performance monitoring metric, PMM, advantageously comprises a factor of $\Sigma_{i=0}^{N}|h(i)|^2$ in its numerator or denominator. When the performance monitoring metric, PMM, is a kind of signal-to-noise-ratio, SNR, this factor is preferably present in the numerator.

In some advantageous embodiments, refinements, or variants of embodiments, the performance monitoring metric, PMM, comprises a factor, in numerator or denominator, that is a difference between:
 a) the raw performance monitoring metric, RPMM, multiplied with the squared absolute value of the lowest-order time-domain Fourier coefficient h(0) and
 b) the sum of squared absolute values of the remaining time-domain Fourier coefficient h(i) for i=1 . . . N.

When the raw performance monitoring metric, RPMM, is given the symbol $\sigma_{\mathit{eff}}^2$, and the calculated "true noise" is given the symbol $\sigma_n^2$, then $\sigma_n^2$ can be calculated as:

$$\sigma_n^2 = (\sigma_{\mathit{eff}}^2 \cdot |h(0)|^2 - \Sigma_{i=1}^{N}|h(i)|^2)/\Sigma_{i=0}^{N}|h(i)|^2.$$

With a convenient normalization, a true signal-to-noise-ratio, TSNR, as a performance monitoring metric, PMM, can be determined as:

$$\mathrm{TSNR} = 1/\sigma_n^2 = \Sigma_{i=0}^{N}|h(i)|^2/(\sigma_{\mathit{eff}}^2 \cdot |h(0)|^2 - \Sigma_{i=1}^{N}|h(i)|^2).$$

In some advantageous embodiments, refinements, or variants of embodiments, the digital signal processing module, DSPM, is configured to generate the raw performance monitoring metric, RPMM, based on the digital input signal by applying at least chromatic dispersion compensation to the digital input signal. Any kind of transmission impairments may be compensated by the digital signal processing module, DSPM, at this stage, e.g. chromatic dispersion compensation, polarization demultiplexing and/or the like. Polarization demultiplexing may comprise compensation polarization mode dispersion (PMD) and/or the compensation of polarization rotations. Pilot symbols in the optical signal can advantageously be used for some or all of the digital signal processing but are not necessary.

In some advantageous embodiments, refinements, or variants of embodiments, the performance monitoring device, PMD, is configured to receive an optical signal with the first bandwidth comprising pilot symbols fulfilling any arbitrary autocorrelation function. In other words, the device is designed and constructed such that it can be applied to any incoming optical signal without prior adjustment. Specifically, the device is capable of processing incoming optical signals with or without pilot symbols or training sequences, and in particular it is capable of processing optical signals without training sequences or with training sequences which are neither Golay sequences nor constant amplitude zero auto correlation (CAZAC) sequences. Since the present invention does not make use of pilot symbols or training sequences for the purpose of performance monitoring, the present invention may also be designated as "data-unaided OSNR estimation", or as "non-data-aided OSNR estimation".

It shall be understood that pilot symbols or training sequences may still be present in the optical signal, e.g. for additional performance monitoring in other ways, for error correction and/or the like. However, it is a striking feature of the present invention that is does not rely on such and that therefore, for the purpose of performance monitoring, optical signals with less overhead may be used.

According to a second aspect, the present invention also provides an optical signal network, comprising at least one network node and a performance monitoring device, PMD, according to embodiment of the first aspect of the present invention. The at least one performance monitoring device, PMD, is connected to the at least one network node. The at least one performance monitoring device, PMD, is configured to receive an optical signal branched off at the at least one network note to which it is connected and to generate the performance monitoring metric, PMM, for said optical signal. Preferably, the optical signal network comprises a plurality of network nodes, wherein a plurality among these is connected to each at least one performance monitoring device, PMD. This allow distributed performance monitoring, and the larger the number of performance monitoring devices, PMD, at different network nodes, the more accurate the performance situation, and performance sinks, among the whole optical signal network can be determined, monitored, and maintained.

Each network node may, among other options, be a multiplexer (e.g. a re-configurable add-drop multiplexer, ROADM), or an amplifier (e.g. an Erbium-doped fiber amplifier, EDFA).

In some advantageous embodiments, refinements, or variants of embodiments, the optical signal network comprises a computing device and at least two performance monitoring devices, PMD, the computing device being configured to receive performance monitoring metrics, PMM, from each of the at least two performance monitoring devices, PMD, and to determine a signal line quality metric, SLQM, based thereon. Similarly, if a plurality of signal line quality metric, SLQM, determinations is done for a plurality of signal lines, then the optical signal network can be accurately monitored.

According to a third aspect of the present invention, a method for performance monitoring of an optical signal having a first bandwidth is provided. The method comprises at least the steps of:

receiving the optical signal having the first bandwidth at a coherent receiver having a second bandwidth that is smaller than the first bandwidth;

outputting, by the receiver, an electrical analog signal with the second bandwidth based on the received optical signal having the first bandwidth;

converting, by an analog-to-digital converter, ADC, the electrical analog signal to a digital input signal;

generating a raw performance monitoring metric, RPMM, based on the digital input signal; and generating a performance monitoring metric, PMM, based on the digital input signal by compensating distortion caused by the coherent receiver having a smaller bandwidth than the optical signal in a raw performance monitoring metric, RPMM.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

In the figures, like reference numerals denote like or functionally like components, unless indicated otherwise. The numbering of method steps does not mean that the steps must be performed in the order according to the numbering except if explicitly or implicitly indicated otherwise.

DETAILED DESCRIPTION OF THE DRAWINGS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
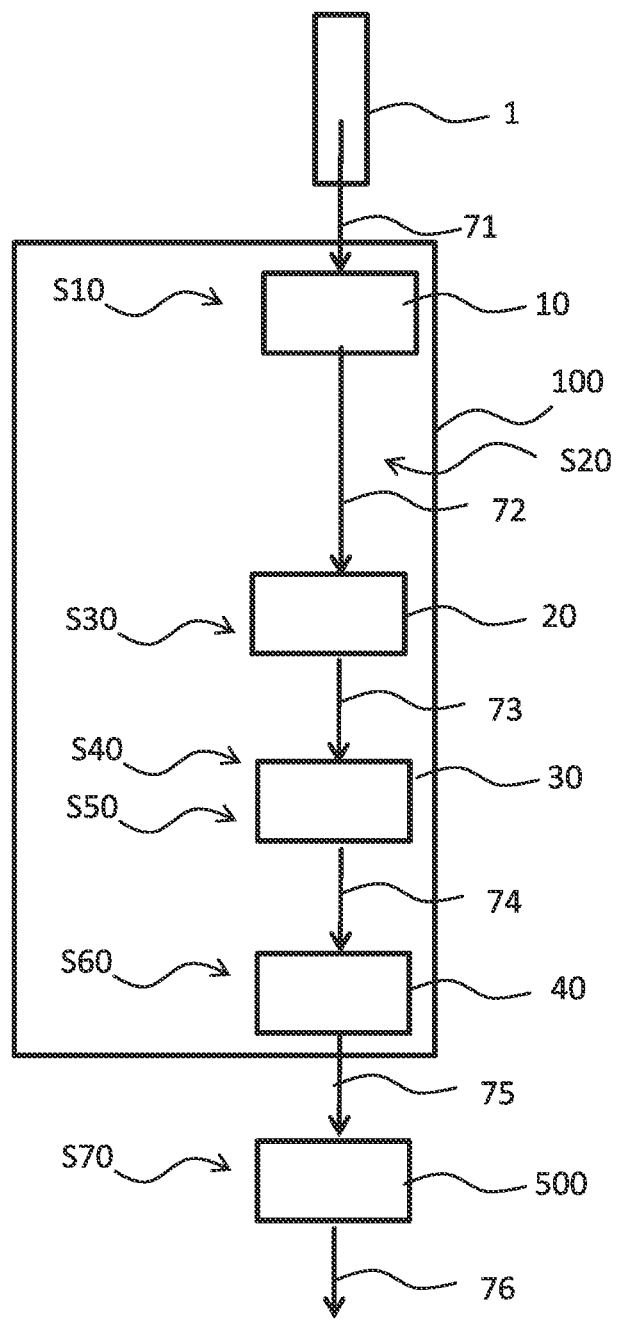
FIG. 1 schematically illustrates performance monitoring device according to an embodiment of the present invention.

FIG. 1 shows a schematic illustration of a performance monitoring device, PMD 100, according to an embodiment of the present invention. FIG. 1 will also be used to illustrate steps of a method for performance monitoring of an optical signal according to an embodiment of the third aspect of the present invention, which will be specifically described in the context of FIG. 3 in the following.

The performance monitoring device, PMD 100, comprises a coherent receiver 10, i.e. a frontend configured to receive an optical signal 71 from a line 1 of an optical signal network. The optical signal 71 has a first bandwidth which is advantageously large in order to be able to carry a large amount of data per time. The first bandwidth is preferably larger than about (or precisely) 50 GHz, more preferably larger than about (or precisely) 100 GHz, even more preferably larger than about (or precisely) 125 GHz. A central frequency $\lambda_c$ can be defined about which the first bandwidth of the optical signal 71 is arranged symmetrically.

The coherent receiver 10 has a second bandwidth that is preferably between about 5% and about 20% of the first bandwidth, preferably between about 7.5% and about 17.5% of the first bandwidth, more preferably between about 10% and about 15% of the first bandwidth. The second bandwidth may comprise the central frequency $\lambda_c$, optionally such that also the second bandwidth is arranged symmetrically about the central frequency $\lambda_c$.

Additionally or alternatively, the second bandwidth is smaller than about (or precisely) 30 GHz, preferably smaller than about (or precisely) 20 GHz. In the presently described example, the optical signal 71 may have 140 GBd with a root-raised cosign of 1%, leading to a first bandwidth of 140*1.01 GHz=141.4 GHz. The coherent receiver 10 may in this illustrative numerical example have a second bandwidth of between 14.14 GHz (corresponding to 10% of the first bandwidth) and 21.21 GHz (corresponding to 15% of the first bandwidth).

Thus, the coherent receiver 10 outputs an electrical analog signal 72 with the second bandwidth.

The performance monitoring device, PMD 100, further comprises an analog-to-digital converter, ADC 20, configured to convert the received electrical signal 72 into a digital input signal 73.

The digital input signal 73 is received by a digital signal processing module, DSPM 30 which can perform various improvements and compensation processes on the digital input signal 73. For example, the digital signal processing module, DSPM 30, and compensate linear impairments, for example dispersion effects such as chromatic dispersion or polarization mode dispersion. The digital signal processing by the digital signal processing module, DSPM 30, can be based on Quadrature Phase Shift Keying, QPSK, for example on pilot symbols in the optical signal 71, e.g. according to the 400ZR implementation agreement or the like.

The digital signal processing module, DSPM 30, is further configured to output a raw performance monitoring metric, RPMM 74, which still comprises artefacts due to the filtering by the coherent receiver 10, i.e. due to the fact that the coherent receiver 10 has a smaller bandwidth (the second bandwidth) than the optical signal 71 having the first bandwidth.

The performance monitoring device, PMD 100, further comprises a noise correction module, NCM 40, configured to generate a performance monitoring metric, PMM 75, based on the digital input signal 73 by compensating distortion (in particular: interference) in the raw performance monitoring metric, RPMM 74, the distortion being caused by the coherent receiver having a smaller bandwidth than the optical signal.

When the raw performance monitoring metric, RPMM 74, is given the symbol $\sigma_{eff}^2$, and the calculated "true noise" is given the symbol $\sigma_n^2$, then $\sigma_n^2$ can be calculated by the digital signal processing module, DSPM 30, as:

$$\sigma_n^2 = (\sigma_{eff}^2 \cdot |h(0)|^2 \cdot \Sigma_{i=1}^N |h(i)|^2)/\Sigma_{i=0}^N |h(i)|^2.$$

With a convenient normalization, a true signal-to-noise-ratio, TSNR, as a performance monitoring metric, PMM 75, can be determined as:

$$TSNR = 1/\sigma_n^2 = \Sigma_{i=0}^N |h(i)|^2/(\sigma_{eff}^2 \cdot |h(0)|^2 \cdot \Sigma_{i=1}^N |h(i)|^2).$$

As is illustrated in FIG. 1, the performance monitoring metric, PMM 75 may then be output by the performance monitoring device, PMD 100. For example, the output performance monitoring metric, PMM 75, may be received by a computing device 500 of an optical signal network. The computing device 500 may be configured to determine a signal line quality metric, SLQM 76, based on at least one performance monitoring metric, PMM 75, output by at least one performance monitoring device, PMD 100, of the optical signal network.

Figure 2:
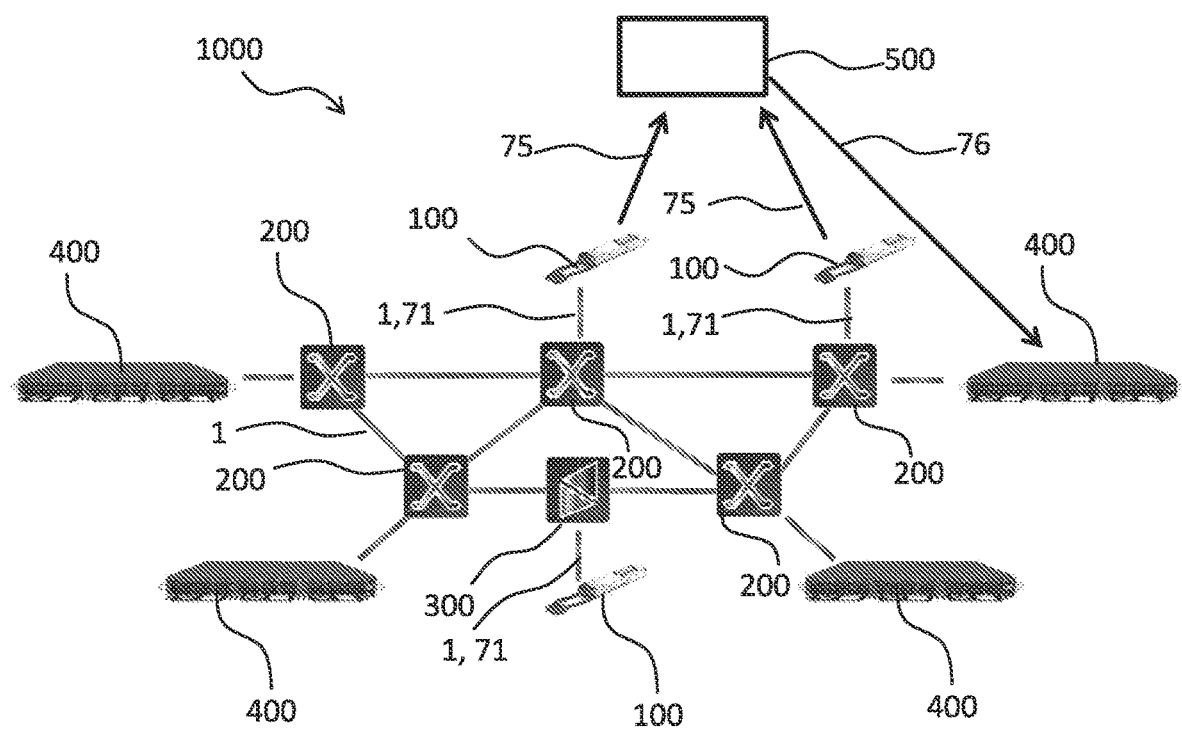
FIG. 2 schematically illustrates an optical signal network according to another embodiment of the present invention.

FIG. 2 schematically illustrates an optical signal network 1000 according to another embodiment of the present invention.

The optical signal network 1000 comprises at least one network node 200, 300 and a performance monitoring device, PMD 100 according to any embodiment of the first aspect of the present invention, the performance monitoring device, PMD 100, being connected to the at least one network node 200, 300. The at least one performance monitoring device, PMD 100 is configured to receive an optical signal 71 branched off at the at least one network note 200, 300 and to generate S60 the performance monitoring metric, PMM 75, for said optical signal 71.

FIG. 2 illustrates an example with five multiplexers 200, which may be re-configurable add-drop multiplexers, ROADM, and one amplifier, e.g. an Erbium-doped fiber amplifier, EDFA. Due to the comparatively simple nature of the performance monitoring devices, PMD 100, of the present invention, the performance monitoring devices, PMD 100, can be deployed in a distributed manner over the optical signal network 1000, preferably at a large number of network nodes 200, 300.

Whereas in a system according to the prior art, performance monitoring is performed at the transmitters/receivers 400 of the optical signals of the optical signal network 1000, the distribution of the performance monitoring devices, PMD 100, allows much more detailed monitoring and maintenance of the performance of the optical signal network 1000.

The optical signal network 1000 may further comprise a computing device 500 configured to receive performance monitoring metrics, PMM 75, by at least two performance monitoring devices, PMD 100, and/or performance monitoring metrics, PMM 75, from the same performance monitoring device, PMD 100, at different time steps, and may be configured to determine a signal line quality metric, SLQM 76, based thereon. This signal line quality metric, SLQM 76, may be used, for example, to inform one of the transmitters/receivers 400 of the current status and performance of the optical signal network 1000.

The signal line quality metric, SLQM 76, may also be used by the computing device 500 to generate a control signal for any of the elements of the optical signal network 1000, e.g. for the performance monitoring devices, PMD 100, for any or all of the network nodes 200, 300 and/or for the transmitters/receivers 400. The control signal may, for example, instruct, encourage, or discourage, the use of certain connections or signal lines. The control signal may also instruct the use of certain encoding and/or error correction algorithms for optical signals travelling along specific routes. For example, in case the use of a signal line with poor performance is necessary or desired for a particular message, the control signal may instruct that said message is encoded with additional overhead so as to improve error correction.

It shall be understood that any of the performance monitoring devices, PMD 100, shown in FIG. 2 may be modified, adapted or refined according to any of the options discussed in the foregoing or in the following for the performance monitoring device of the present invention.

Figure 3:
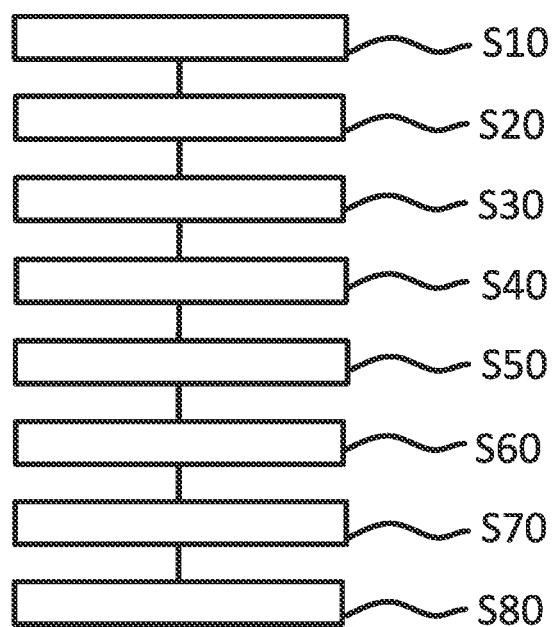
FIG. 3 shows a flow diagram schematically illustrating a method according to still another embodiment of the present invention.

FIG. 3 shows a schematic flow diagram illustrating a method for performance monitoring of an optical signal 71 having a first bandwidth according to an embodiment of the third aspect of the present invention. The method may be performed with, or by, any embodiment of the performance monitoring device, or of the optical signal network according to the present invention. Accordingly, any embodiment of the method may be modified, adapted or refined according to any of the options discussed in the foregoing or in the following for the performance monitoring device and/or for the optical signal network according to the present invention, and vice versa.

In a step S10, the optical signal 71 having the first bandwidth at a coherent receiver 10 having a second bandwidth that is smaller than the first bandwidth, in particular as has been described in the foregoing with respect to FIG. 1.

In a step S20, the coherent receiver 10 outputs an electrical analog signal 72 with the second bandwidth, in particular as has been described in the foregoing with respect to FIG. 1 and the analog-to-digital converter, ADC 20.

In a step S30, the electrical signal 72 is converted into a digital input signal 73, in particular as has been described in the foregoing with respect to FIG. 1.

In a step S40, digital signal processing is performed on the digital input signal 73, which may include compensating linear impairments, for example dispersion effects such as chromatic dispersion or polarization mode dispersion. The digital signal processing by the digital signal processing module, DSPM 30, can be based on Quadrature Phase Shift Keying, QPSK, for example on pilot symbols in the optical signal 71, e.g. according to the 400ZR standard or the like.

In a step S50, a raw performance monitoring metric, RPMM 74, is output, which still comprises artefacts due to the fact that the coherent receiver 10 has a smaller bandwidth (the second bandwidth) than the optical signal 71 having the first bandwidth. Steps S50 and S60 may be performed in particular as has been described in the foregoing with respect to FIG. 1 and the digital signal processing module, DSPM 30.

In a step S60, a performance monitoring metric, PMM 75, is generated, based on the digital input signal 73 by compensating interference or distortion in the raw performance monitoring metric, RPMM 74, wherein the interference or distortion is caused by the coherent receiver having a smaller bandwidth than the optical signal 71. Step S60 may be performed in particular as has been described in the foregoing with respect to FIG. 1 and the noise correction module, NCM 40.

In a step S70, a signal line quality metric, SLQM 76, may be determined (e.g. by a computing device 500 of an optical signal network 1000) based on at least two received performance monitoring metrics, PMM 75, e.g. from at least two different performance monitoring devices, PMD 100, and/or from at least two different time points (from one or more performance monitoring devices, PMD 100).

In a step S80, a control signal based on the signal line quality metric, SLQM 76, may be generated, in particular as has been described in the foregoing with respect to FIG. 2 and the computing device 500.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated.

LIST OF REFERENCE SIGNS 1 optical line
10 coherent receiver
20 analog-to-digital converter, ADC
30 digital signal processing module, DSPM
40 noise correction module, NCM
71 optical signal
72 electrical analog signal
73 digital input signal
74 raw performance monitoring metric, RPMM
75 performance monitoring metric, PMM
76 signal line quality metric, SLQM
100 performance monitoring device, PMD
200 multiplexer
300 amplifier
400 transmitter/receiver
500 computing device
1000 optical signal network
S10 . . . S80
    method steps

The invention claimed is:

1. A performance monitoring device, PMD (100), for performance monitoring of an optical signal (71) having a first bandwidth,
the performance monitoring device (100) comprising a coherent receiver (10), an analog-to-digital-converter, ADC (20), a digital signal processing module, DSPM (30), and a noise correction module, NCM (40),
the receiver (10) having a second bandwidth that is smaller than the first bandwidth (BW1) such that the receiver (10) is configured to output an electrical analog signal (72) with the second bandwidth based on the received optical signal (71) having the first bandwidth, the analog-to-digital converter, ADC (20), being configured to generate from the electric analog signal (72) a digital input signal (73) with the second bandwidth;
the digital signal processing module, DSPM (30), being configured to generate a raw performance monitoring metric, RPMM (74), based on the digital input signal (73);
wherein the noise correction module, NCM (40), is configured to generate a performance monitoring metric, PMM (75), based on the digital input signal (73) by compensating distortion in the raw performance monitoring metric, RPMM (74), the distortion being caused by the coherent receiver (10) having a smaller bandwidth than the optical signal (71); and
wherein the second bandwidth is between about 5% and about 20% of the first bandwidth.

2. The device (100) of claim 1,
wherein the second bandwidth is between about 7.5% and about 17.5% of the first bandwidth.

3. The device (100) of claim 1,
wherein the first bandwidth (BW1) is larger than about 50 GHz and/or wherein the second bandwidth is smaller than about 30 GHz.

4. The device (100) of claim 1,
wherein the receiver (10) is configured to receive a portion having the second bandwidth of the optical signal (71) that comprises a center frequency Ac of the optical signal (71).

5. The device (100) of claim 1,
wherein the performance monitoring metric, PMM (75), comprises a factor, in numerator or denominator, that is a sum of squared absolute values of time-domain Fourier coefficients h(i) of the digital input signal (73), for i=0 . . . . N, N being a predefined integer.

6. The device (100) of claim 5,
wherein the performance monitoring metric, PMM (75), comprises a factor, in numerator or denominator, that is a difference between:
a) the raw performance monitoring metric, RPMM (74), multiplied with the squared absolute value of the lowest-order time-domain Fourier coefficient h(0) and
b) the sum of squared absolute values of the remaining time-domain Fourier coefficient h(i) for i=1 . . . . N.

7. The device (100) of claim 1,
wherein the digital signal processing module, DSPM (30), is configured to generate the raw performance monitoring metric, RPMM (74), based on the digital input signal (73) by applying at least chromatic dispersion compensation to the digital input signal (73).

8. The device of claim 1, configured to receive an optical signal with the first bandwidth comprising pilot symbols fulfilling any arbitrary autocorrelation function.

9. An optical signal network (1000), comprising at least one network node (200, 300) and a performance monitoring device, PMD (100), according to claim 1 connected to the at least one network node (200, 300), the performance monitoring device, PMD (100), configured to receive an optical signal (71) branched off at the at least one network note (200, 300) and to generate the performance monitoring metric, PMM (75), for said optical signal (71).

10. The optical signal network (1000) of claim 9,
wherein the at least one network node is a multiplexer (200) and/or an amplifier (300).

11. The optical signal network (1000) of claim 9,
wherein the optical signal network (1000) comprises a computing device (500) and at least two performance monitoring devices, PMD (100), the computing device (500) being configured to receive performance monitoring metrics, PMM (75), from each of the at least two performance monitoring devices, PMD (100), and to determine a signal line quality metric, SLQM (76), based thereon.

12. A method for performance monitoring of an optical signal (71) having a first bandwidth, comprising at least steps of:

receiving (S10) the optical signal (71) having the first bandwidth (BW1) at a coherent receiver (10) having a second bandwidth that is smaller than the first bandwidth (BW1);

outputting (S20), by the receiver (10), an electrical analog signal (72) with the second bandwidth based on the received optical signal (71) having the first bandwidth (BW1);

converting (S30) the electrical analog signal (72) to a digital input signal (73);

generating (S50) a raw performance monitoring metric, RPMM (74), based on the digital input signal (73);

generating (S60) a performance monitoring metric, PMM, based on the digital input signal (73) by compensating distortion in the raw performance monitoring metric, RPMM (74), caused by the coherent receiver (10) having a smaller bandwidth than the optical signal (71); and wherein the second bandwidth is between about 5% and about 20% of the first bandwidth.

13. The method of claim 12,
wherein the second bandwidth is between about 7.5% and about 17.5% of the first bandwidth.

14. The method of claim 12,
wherein the first bandwidth is larger than 50 GHz and/or wherein the second bandwidth is smaller than 20 GHz.

15. The method of claim 12,
wherein the performance monitoring metric, PMM (75), comprises a factor, in numerator or denominator, that is a sum of squared absolute values of time-domain Fourier coefficients $h(i)$ of the digital input signal (73), for $i=0 \ldots N$, N being a predefined integer.

* * * * *